UNITED STATES PATENT OFFICE.

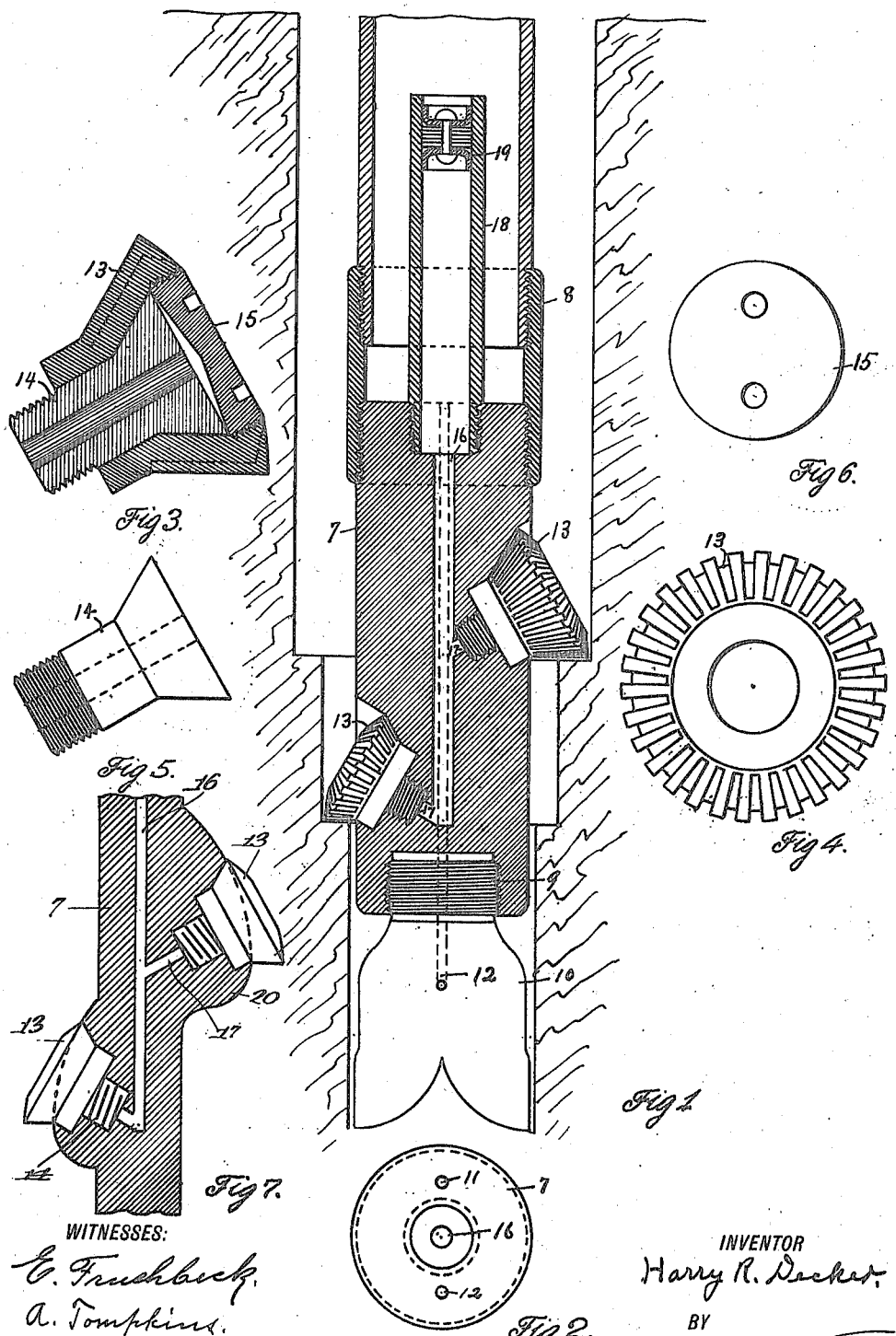

HARRY R. DECKER, OF HOUSTON, TEXAS.

DRILL.

1,152,151. Specification of Letters Patent. Patented Aug. 31, 1915.

Application filed April 3, 1911. Serial No. 618,664.

*To all whom it may concern:*

Be it known that I, HARRY R. DECKER, a citizen of the United States, residing at Houston, in the county of Harris and State of Texas, have invented certain new and useful Improvements in Drills, of which the following is a specification.

My invention relates to new and useful improvements in drills.

The object of the invention is to provide a device of the character described having a suitable cutting point and being also provided with side cutters, arranged opposite, or in staggered relation, to each other around the drill head, each cutter projecting slightly farther from the head than the cutter therebeneath and designed to gradually enlarge and thoroughly ream out the bore made by the cutting point of the drill. These side cutters are rotatably mounted in suitable bearings of the drill head and the invention further comprehends a method for lubricating said bearings as well as a means whereby water is introduced to the drill point for the purpose of flushing the bore.

With the above and other objects in view my invention has particular relation to certain novel features of construction, operation and arrangement of parts, an example of which is given in this specification and illustrated in the accompanying drawings, wherein:—

Figure 1 is a side elevation, partially in section, of the drill attached to a drill stem. Fig. 2 is an end view of the drill head viewed from above. Fig. 3 is a central sectional view of one of the side cutters. Fig. 4 is an outer end view thereof. Fig. 5 is a side elevation of the cutter bearing member. Fig. 6 is a plan view of the cutter cap, and Fig. 7 is a sectional view of a modified form of the drill head having laterally projecting bosses in which the side cutters are anchored.

Referring now more particularly to the drawing, wherein like numerals of reference designate similar parts in each of the figures, the numeral 7 refers to the drill head which, in its preferred form, is an oblong, solid cylindrical body as shown in Fig. 1. One end of this member is exteriorly threaded and when in use is screwed into the interiorly threaded lower end of the drill stem, 8. The other end of this head has an interiorly threaded recess into which the shank 9 of the drill point 10 screws.

The head 7 is provided with water passageways 11 and 12 located on opposite sides of the axial center thereof and communicating with the interior of the drill stem and discharging on each side of the drill point, and provided for the purpose of conducting the flushing fluid from the drill stem to the drill point.

The drill head 7 carries a plurality of toothed rotatable side cutters 13. These cutters are substantially conical in shape and are located in sockets provided in the sides of the head. Said sockets are located on opposite sides of said head and preferably in staggered relation to each other and the cutters are secured therein by means of stud bolts 14 which pass through said cutters, as shown in Fig. 3, and screw into threaded recesses which form extensions of said sockets in said head. The cutters are hollow and the stud bolts have enlarged heads which fit nicely within the hollow portions, said heads being conical in shape and conforming to the shape of the hollow interior of the cutters and thus holding said cutters firmly in place but permitting the rotation thereof on said bolts. When the bolt is screwed into position its head is completely buried in the cutter and the cap 15 is then screwed into the outer end of the cutter so as to completely protect said bolt and the bearing between the bolt and cutter, from grit and sand and other foreign matter. The rim of the outer end of the cutter is beveled and forms a face, substantially at right angles to the conical shaped side of the cutter. The operative sides and end of the cutter are corrugated or toothed so as to more readily cut and wear away the obstruction to be removed thereby. These cutters are so set in their sockets that the sides thereof operating against the obstruction to be removed will extend at right angles to the head 7 and the ends thereof will operate against the side of the bore and ream the same out and keep it perfectly round and smooth.

Each cutter has a greater lateral projection from the head 7 than the cutter immediately therebeneath so that the bore made by the point 10 will be gradually enlarged by each of said side cutter, as shown in Fig. 1. This result may be attained by the use of different sized cutters, or by burying the lower cutters deeper in the head than the ones thereabove and the upper portion of the head may be provided with laterally extending bosses 20, as shown in Fig. 7, in which the side cutters 13 may be anchored, in which case those above will project out farther than the ones immediately therebeneath, for the purpose hereinbefore specified, and by the use of said bosses the diameter of the head proper may be greatly reduced, thus allowing more space between the drill head and the sides of the bore and lessening the liability of the drill to become clogged.

The head 7 is provided with a centrally located oil passageway 16 which extends from the upper end thereof along the axial line of said head and stops short of the lower end thereof. Side passageways 17 communicate with passageway 16 and also with axially extending passageways which lead entirely through the stud bolts 14 and communicate with oil chambers formed between the outer end of said bolts and the inner sides of caps 15. This chamber is formed by concaving the under side of said cap, as shown in Fig. 3.

As shown in Fig. 1, the upper end of head 7 is provided with an interiorly threaded recess, which is centrally located and which is designed to receive the lower exteriorly threaded end of oil pipe 18. This pipe is provided to retain a lubricating oil and when filled the plunger 19 is inserted therein. The water pressure within drill stem 8 operating against the plunger 19 forces the oil from its receptacle through passageways 16 and 17 and into the oil chamber formed between the head of bolt 14 and cap 15, from which the lubricating fluid finds its way to the bearing between the cutter 13 and its support and keeps said bearing thoroughly lubricated.

This device is to be used as a rotary drill and while drilling, it is obvious that the weight of the drill stem will be borne by the drill point and the conical shaped side cutters, thus relieving said side cutters of a portion of the weight and distributing said weight between the drill point and each of the side cutters.

What I claim is:—

1. In a device of the character described a rotatable cutting member having its operative face toothed, a supporting member extending therethrough and forming a bearing for said cutting member and a detachable cap, secured in the exposed end of said cutting member and inclosing said bearing.

2. In a device of the character described a rotatable cutting member having two toothed operative faces, a supporting member extending therethrough and forming a bearing for said cutting member and a detachable cap having its under face concaved, secured in the exposed end of said cutting member and inclosing said bearing.

3. In a device of the character described a rotatable cutting member having its operative face toothed, a supporting member extending therethrough and forming a bearing for said cutting member and a detachable cap having its under face concaved, secured in the exposed end of said cutting member and inclosing said bearing.

4. In a device of the character described a cone shaped cutting member and a support therefor, a bearing member upon which the same is rotatably mounted and which projects from the apex of the cutting member and engages with said support, and a detachable cap secured in the cutting member and inclosing said bearing member.

5. A drill composed of a suitable head and approximately frusto conical shaped rotatable cutters carried by the sides thereof, the sides of said cutters being corrugated, forming teeth, the under sides of the cutters extending approximately at right angles to the axis of the head, and suitable bearing members secured to the head on which members the cutters rotate.

6. A drill including a suitable head and a cutting point carried by the lower end thereof, approximately frusto conical shaped members mounted on the sides of said head, whose axes extend from the head at approximately a 45° angle, and whose under faces in operation extend from the head at approximately a 90° angle, to the axis of the head, and bearing members engaging with the head on which members the respective cutters rotate.

7. In a drill, a drill head and laterally extending bearing members carried thereby, and arranged on opposite sides thereof, and projecting at unequal distances therefrom, approximately frusto conical shaped rotatable side cutters having their operative faces toothed, and through which the respective bearing members extend, the toothed faces operating against the bore being formed extending in operation, at approximately right angles to the axis of the head.

In testimony whereof I have signed my name to this specification in the presence of two subscribing witnesses.

HARRY R. DECKER.

Witnesses:
J. W. YEAGLEY,
A. TOMPKINS.